(12) United States Patent
Weinbrecht et al.

(10) Patent No.: US 7,774,445 B1
(45) Date of Patent: Aug. 10, 2010

(54) SYSTEM AND METHOD FOR MANAGING ZONING IN A STORAGE AREA NETWORK BY COMPARING ZONE SETS AND IDENTIFYING DIFFERENCES BETWEEN ZONE SETS

(75) Inventors: Freda Weinbrecht, Dracut, MA (US); Hanna Yehuda, Newton, MA (US); James E. Lavallee, Boylston, MA (US); Francois Gauvin, Salem, MA (US)

(73) Assignee: EMC Corporation, Hopkinton, MA (US)

( * ) Notice: Subject to any disclaimer, the term of this patent is extended or adjusted under 35 U.S.C. 154(b) by 1625 days.

(21) Appl. No.: 11/023,301

(22) Filed: Dec. 27, 2004

(51) Int. Cl.
*G06F 15/173* (2006.01)
(52) U.S. Cl. ............... 709/223; 709/224; 709/225; 709/226
(58) Field of Classification Search ............ 709/223
See application file for complete search history.

(56) References Cited

U.S. PATENT DOCUMENTS

| | | | |
|---|---|---|---|
| 6,952,698 B2 * | 10/2005 | Delaire et al. ............... 707/10 |
| 7,058,715 B2 * | 6/2006 | Jain et al. ................... 709/225 |
| 2003/0145041 A1 * | 7/2003 | Dunham et al. ............. 709/203 |
| 2003/0149753 A1 * | 8/2003 | Lamb ......................... 709/223 |
| 2004/0088396 A1 * | 5/2004 | Hammons et al. ........... 709/223 |
| 2007/0094378 A1 * | 4/2007 | Baldwin et al. ............. 709/223 |

* cited by examiner

*Primary Examiner*—Jeffrey Pwu
*Assistant Examiner*—Abdelnabi O Musa
(74) *Attorney, Agent, or Firm*—Chapin IP Law, LLC

(57) ABSTRACT

In a storage area network (SAN), first and second zone sets are compared to identify differences, including zones appearing in one zone set but not the other, and zones in both zone sets but having different contents in each. A zone comparison user interface (UI) window is displayed on a SAN management computer system via user selection from a pop-up menu appearing when a SAN object is selected from a hierarchical object display. The UI window includes a differences display area to display zone set differences and includes fields for identifying a type of zone difference, a zone identifier, and identifiers of host computers and storage devices of a zone. Based on differences identified between the first and second zone sets, identifiers of those zones of the first and second zone sets having a predetermined difference type are displayed. Also displayed, for each such zone, are (i) identifiers of the host computers and storage devices of the zone, and (ii) a difference type indicator indicating which of the difference types applies to the zone.

20 Claims, 11 Drawing Sheets

SYSTEM AND METHOD FOR MANAGING ZONING IN A STORAGE AREA NETWORK BY COMPARING ZONE SETS AND IDENTIFYING DIFFERENCES BETWEEN ZONE SETS

BACKGROUND OF THE INVENTION

The invention is related to the field of managing computer data storage systems.

Computer data storage systems have evolved into complex arrangements of specialized elements that are coupled together, such as in a modern storage-area network (SAN). A SAN, for example, includes host computers running application programs with storage requirements, such as for file systems and databases. The SAN further includes dedicated storage devices, often termed "arrays", that are packaged into cabinets and are physically and functionally separate from the host computers. The hosts and storage devices are coupled together by a high-speed data network which includes transmission lines and switches.

Because of the complexity and size of SANs, specialized software tools are used to assist a storage system administrator in managing the configuration and operation of the SAN. An example of such storage management tools includes a suite of tools known as "EMC Control Center" sold by EMC Corporation. These tools include a wide variety of management-related features, including controls that enable a system administrator to configure storage and establish channels between the hosts and respective storage devices allocated for use by the hosts, and include monitoring functions for gathering many types of information about system operation, including for example the amount of allocated storage actually used by the respective hosts, the amount of storage traffic flowing through switches or into/from storage devices, the presence of faults or other reportable conditions in the system, etc.

One aspect of SAN management is generally referred to as "zoning", and involves the establishment of "zones" that define access-control groupings of host computers and storage devices of the SAN. When a set of zones (referred to as a "zone set") is active in the SAN, the access control is enforced by switches in the SAN such that the host computer of each zone of a zone set is allowed to access the storage devices of the same zone and not allowed to access storage devices of other zones of the zone set. This type of access control is fairly high-level or coarse, and can be used in conjunction with other known access-control techniques to implement an overall desired access-control regime for a SAN.

SUMMARY OF THE INVENTION

When zoning is employed in a SAN, it is often necessary to change the contents of one or more zones. For example, if a new storage device is to be added to the SAN and to a particular zone thereof, it is necessary to re-define the pertinent zone to include the new storage device and the port(s) of a switch of the SAN that is/are connected to the new device. In other cases, it is desirable to employ different zoning under different operating circumstances. For example, in a given SAN there may be one zone set used for normal business hours and another zone set for non-work hours, in order to provide greater security to certain data within the SAN. In each case, the different zoning regimes can be represented by different zone sets, and the transition from one regime to another can be realized by replacing the zone set that is currently active in the SAN with a new zone set representing the new zoning regime. However, any such replacing must generally be done with great care, because any mistakes in the new zone set may cause significant operational problems in the SAN. If a new zone set inadvertently omits a zone or includes a zone with an erroneous definition, then host computers of such a zone may suddenly be unable to communicate with storage devices on which their data is stored, which can result in service interruptions to computer system users. Additionally, host computers of a given zone may become able to access data on storage devices of other zones that the host computers do not have proper authorization to obtain, potentially compromising the security of the SAN. It is important to avoid such operating conditions when managing the zoning in a SAN.

In accordance with the present invention, methods and apparatus are disclosed for enabling a user such as a SAN manager to manage zoning in a SAN, specifically to help the user verify that the contents of a zone set are accurate. The method can be utilized, for example, as part of the process of activating a new zone set in a SAN, to reduce the possibility of activating an erroneous zone set.

In the disclosed method, first and second zone sets are compared to identify differences, which include (a) zones in the first zone set but not in the second zone set, and (b) zones in the second zone set but not in the first zone set. The two zone sets may be, for example, existing or planned zone sets that are not currently active in the SAN. The method may be particularly useful when one of the zone sets is a slightly modified version of the other, such as when a new zone set is being created due to some incremental change in the SAN such as addition of new storage devices. The unmodified zone set may also be the currently active zone set of the SAN, in which case the comparison is useful to see exactly how the modified zone set differs from the active zone set before activation of the modified zone set. The method may also include comparing zones that have the same name in two different zone sets, to identify how their contents may be different from each other.

A zone comparison user interface (UI) window is displayed on a display of a SAN management computer system. The zone comparison UI window includes a differences display area for displaying zone set differences, including fields for identifying (a) a type of zone difference, (b) a zone identifier, and (c) respective identifiers of host computers and storage devices constituting the contents of a zone. Types of zone differences can be zones appearing in the first zone set but not the second, zones appearing in the second zone set but not the first, and zones that have different contents in the two zone sets.

Information is then displayed in the differences display area based on the differences identified between the first and second zone sets. This information includes identifiers of those zones of the first and second zone sets that have a predetermined difference type (such as one of those just named) and, for each zone having the predetermined difference type, (i) identifiers of the host computers and storage devices of the zone, and (ii) a difference type indicator indicating which of the difference types applies to the zone. Specific examples of such displayed information are given in the Detailed Description below.

In one particular configuration, the zone comparison UI window includes a control that is operable by the user to select which types of zone set differences are to be displayed. The types include (i) zones in only one of two zone sets being compared, and (ii) zones in both of the zone sets but having different contents in each. The zone comparison UI window may also include a summary display area for displaying a summary of the zone set differences displayed in the differences display area.

The zone comparison method can be used to compare zone sets that are both inactive in the SAN, and it can also be used to compare one inactive zone set (e.g., a zone set that is being planned for the SAN) with the currently active zone set. This feature helps the user ensure that only desired zoning changes will occur upon activation of the planned zone set.

Other aspects and advantages of the disclosed methods and apparatus are described in the Detailed Description below.

DETAILED DESCRIPTION

Figure 1:
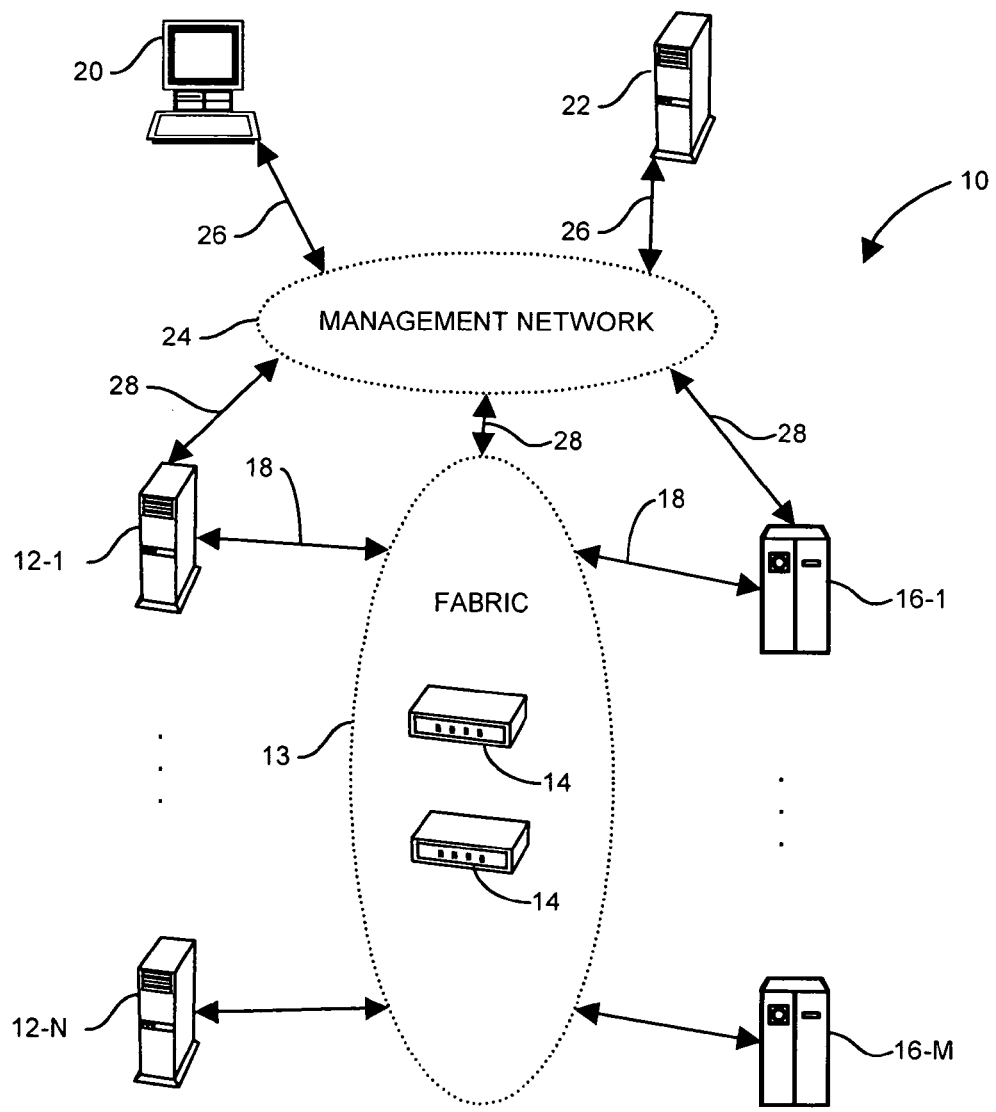
FIG. 1 is a block diagram of a system including a storage area network (SAN) with a SAN management station in accordance with the present invention.

FIG. 1 shows an exemplary storage area network (SAN) 10 including host computers 12, a fabric 13 including a plurality of switches 14, and storage devices 16 all interconnected by high-speed storage interconnection buses 18, such as Fiber Channel buses. A SAN management station 20 and SAN management server 22 are coupled to a SAN management network 24, which may be for example a conventional TCP/IP network employing Ethernet or similar physical interconnections 26. The host computer 12, storage devices 16 and switches 14 are all coupled to the SAN management network 24 via similar physical interconnections 28. As described in more detail below, the SAN management station 20 and SAN management server 22 cooperate to perform a SAN management client-server process for performing certain SAN management functions with respect to the components of the SAN 10.

Figure 2:
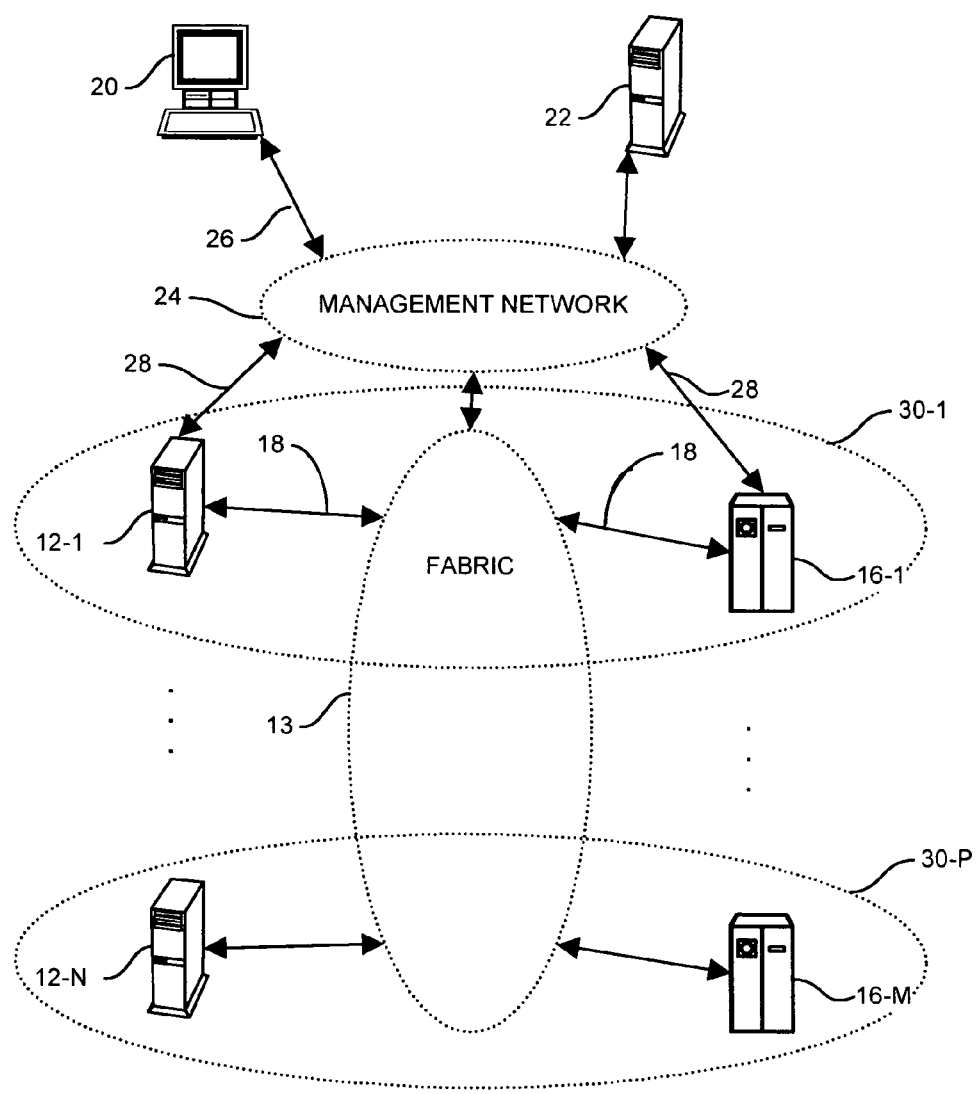
FIG. 2 is block diagram showing the use of zoning in the system of FIG. 1.

FIG. 2 illustrates a technique referred to as "zoning" used within the SAN 10. Specifically, as shown in FIG. 2, host computer 12-1 and storage device 16-1 are members of a first zone 30-1, and host computer 12-N and storage device 16-M are members of a second zone 30-2. Zoning is used to provide one form of access control. A host computer 12 residing in a given zone is permitted to direct storage requests to the storage device(s) residing in the same zone, but not to storage devices residing in other zones (i.e., in zones of which the host computer is not a member). Zoning can be used in a variety of settings to enforce a variety of access-control policies. In a corporate data center, for example, zoning can be used to provide hardware-level isolation among the storage devices and associated data of different organizations, for example in furtherance of privacy policies, security policies, etc. In the embodiment shown in FIG. 2, there is one host computer 12 and one storage device 16 in each zone 30. Although in FIG. 2 the zones 30 are shown as disjoint, it is possible and in many cases desirable for zones to overlap at a storage device 16, i.e., for a given storage device 16 to be a member of multiple zones 30. In such a configuration, each host computer 12 that resides in a zone with a given storage device 16 may direct storage requests to that storage device, but there is no possibility of a given host computer 12 directing storage requests to another host computer 12.

Figure 3:
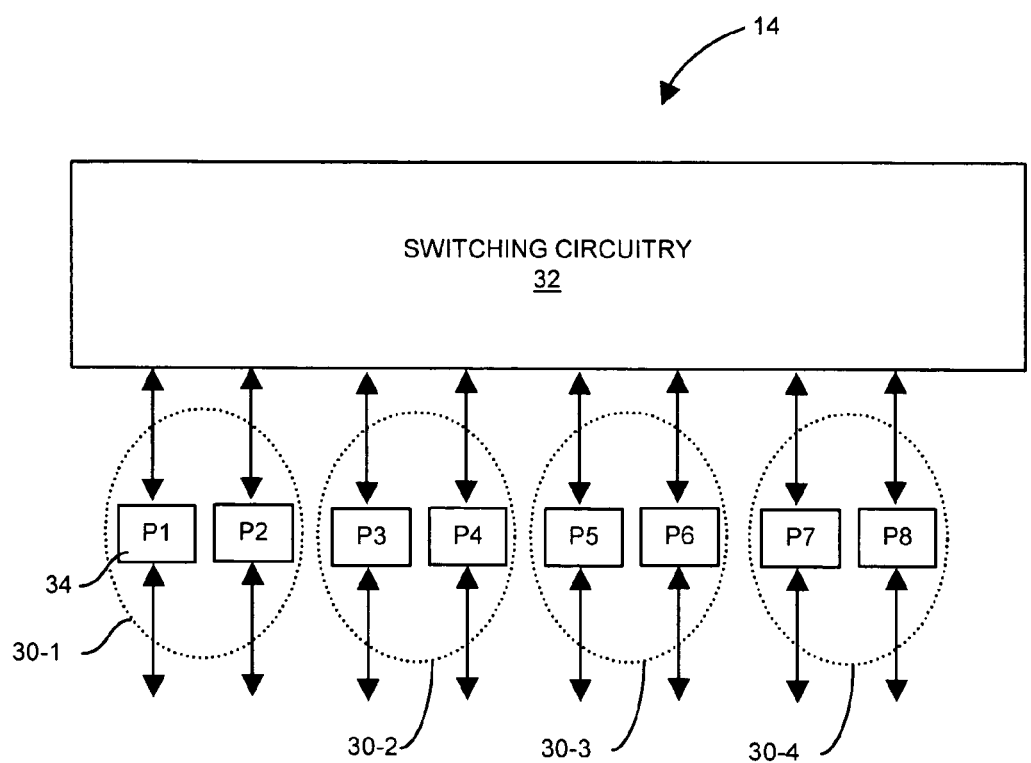
FIG. 3 is a block diagram of a switch within the SAN of FIG. 1.

As shown in FIG. 3, each switch 14 generally includes switching circuitry 32 and a plurality of ports 34 for connection to respective storage buses 18. Zoning is implemented within the switch 14. Specifically, each zone is defined as a collection of ports 34 among which storage requests and responses may be transferred. In an exemplary configuration shown in FIG. 3, the switch 14 implements four zones as follows:

| Zone | Ports |
|------|-------|
| 30-1 | P1, P2 |
| 30-2 | P3, P4 |
| 30-3 | P5, P6 |
| 30-4 | P7, P8 |

The use of numerically adjacent ports 34 for each zone 30 in the example of FIG. 3 is merely for convenience of description; in general, a zone 30 may include any ports 34 of a given switch 14 or fabric 13.

Each switch 14 within the fabric 13 is configured, via the SAN management station 20 and SAN management server 22, with a set of zones that are to be enforced. A set of zones that can be configured in the SAN 10 is referred to herein as a "zone set". As an example, the four zones 30 in FIG. 3 constitute a zone set. Within the switch 14, control circuitry within each port 34 attached to a host computer 12 is responsible for examining each storage request from the host computer 12 to determine whether it is directed to a storage device 16 that is in a common zone 30 with the requesting host computer 12. Specifically, the control circuitry determines whether each storage request is directed to a storage device 16 coupled to a port 34 that is in the same zone 30 as the requesting host computer 12. If so, the request is passed along to the destination port 34 for forwarding to the target storage device 16. If not, the request is generally ignored. It is left to the requesting host computer 12 to determine that the request has failed and to take appropriate recovery action.

Figure 4:
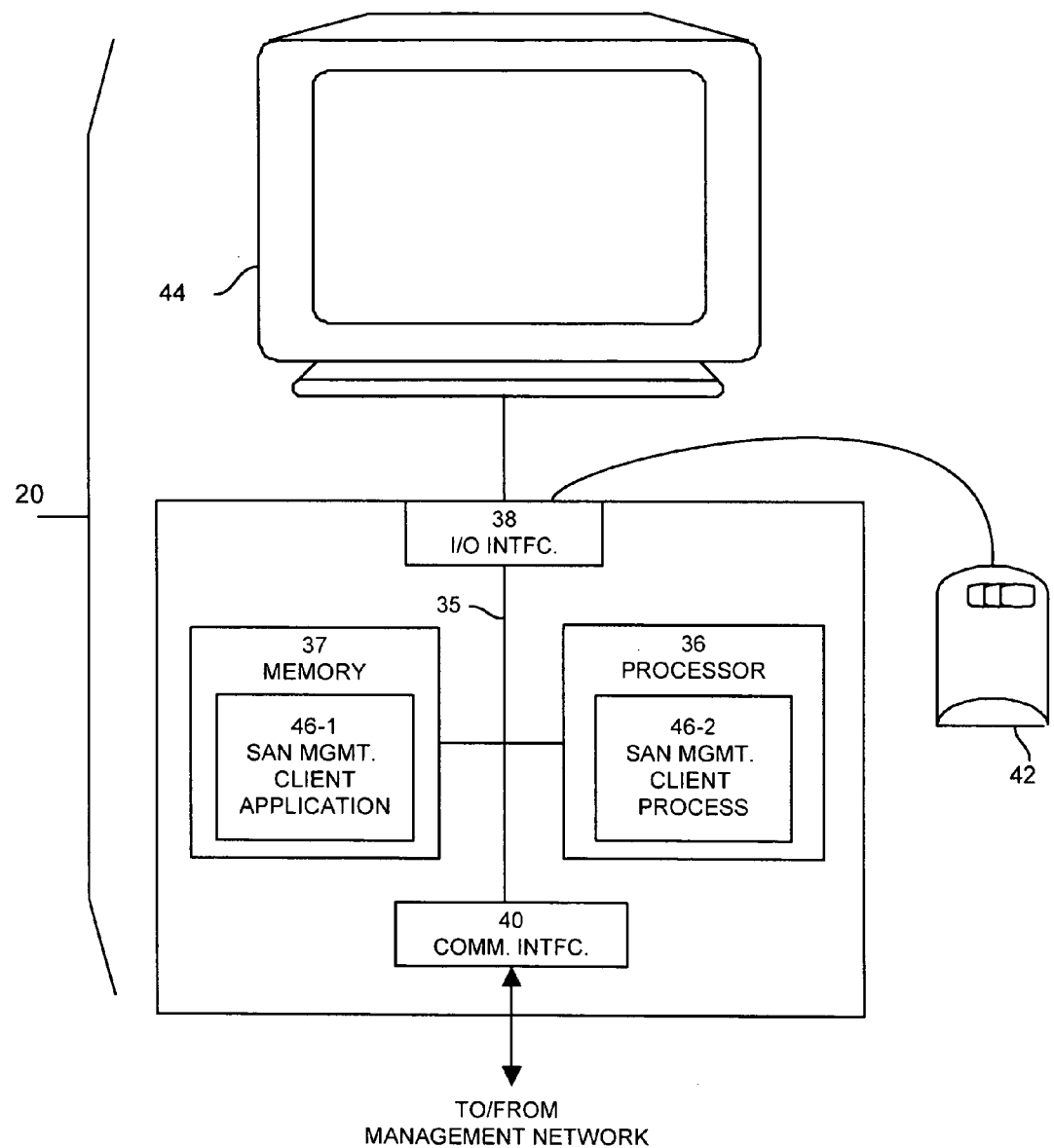
FIG. 4 is a block diagram of the SAN management station of FIG. 1.

FIG. 4 illustrates an example arrangement of the SAN management station 20. The SAN management station 20 includes an interconnection mechanism 35 that couples a memory system 37, a processor 36, an input/output (I/O) interface 38 and a communications interface 40. The input/output interface 38 allows peripheral devices to be connected to the SAN management station 20. In this example, coupled to the input/output interface 38 and operating as part of the SAN management station 20, are a peripheral input device 42 such as a mouse and/or a keyboard and a peripheral output device such as a computer display 44 upon which the SAN management station 20 can render or otherwise display visual images such as a graphical user interface as described herein. The communications interface 40 allows the SAN management station 20 to communicate with external devices such as devices coupled to the SAN management network 24 of FIG. 1.

The memory system 37 is encoded with a SAN management application 46-1. The SAN management application 46-1 represents software code such as data and/or logic instructions (e.g., stored in the memory 37 or on another computer readable medium such as a disk) that embody the processing functionality of embodiments of the invention. The processor 36 can access the memory system 37 via the interconnection mechanism 35 in order to launch, run, execute, interpret or otherwise perform the logic instructions of the SAN management application 46-1 in order to produce a SAN management process 46-2. In other words, the SAN management process 46-2 represents one or more portions of the SAN management application 46-1 (or the entire application 46-1) executing within or upon the processor 36 in the SAN management station 20. For purposes of the discussion of the operation of embodiments of the invention, general reference will be made to the SAN management process 46 as performing the various steps and operations to carry out the features of embodiments of the invention.

Is to be understood that embodiments of the invention include the SAN management application 46-1 (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within a memory system such as memory system 37 (e.g., within random access memory or RAM). It is also to be understood that other embodiments of the invention can provide the SAN management application 46-1 operating within the processor 36 as the SAN management process 46-2. While not shown in this example, those skilled in the art will understand that the SAN management station 20 may include other processes and/or software and hardware components, such as an operating system and Web browser, which have been left out of this illustration for ease of description of the invention. In addition, the display 44 need not be coupled directly to the computerized device. In such cases, the SAN management application 46 can execute on one computerized device and can be remotely accessed over a network, for example, in which case the graphical user interface is displayed locally to the user, while the SAN management process 46-2 is executed remotely.

Directing attention now to the graphical user interface, when the SAN management process 46-2 operates within the SAN management station 20, an operator can use the input device 42 to control an input selector such as a mouse pointer to operate on various displayed graphical elements, such as data entry fields and icons, according to the embodiments of the invention. The processor 36 performs the SAN management process 46-2 to carry out this processing as explained herein. Specific operations of embodiments of the invention are discussed next with reference to a flow chart of processing steps in FIG. 5 below and exemplary graphical displays in the remaining Figures.

As mentioned above, the present disclosure is directed primarily to the management of zone sets within a SAN. In particular, techniques are described for enabling a user to compare zone sets in a user-selectable way, and for displaying comparison results to a user. The techniques may be used with arbitrary zone sets, such as pairs of zone sets that might be planned or are otherwise not currently active in the SAN 10. The techniques may also be used to compare one inactive zone set with a zone set that is currently active within the SAN 10, i.e., a zone set whose access-control zoning is currently being enforced by the switches 14. These are described in turn below.

Figure 5:
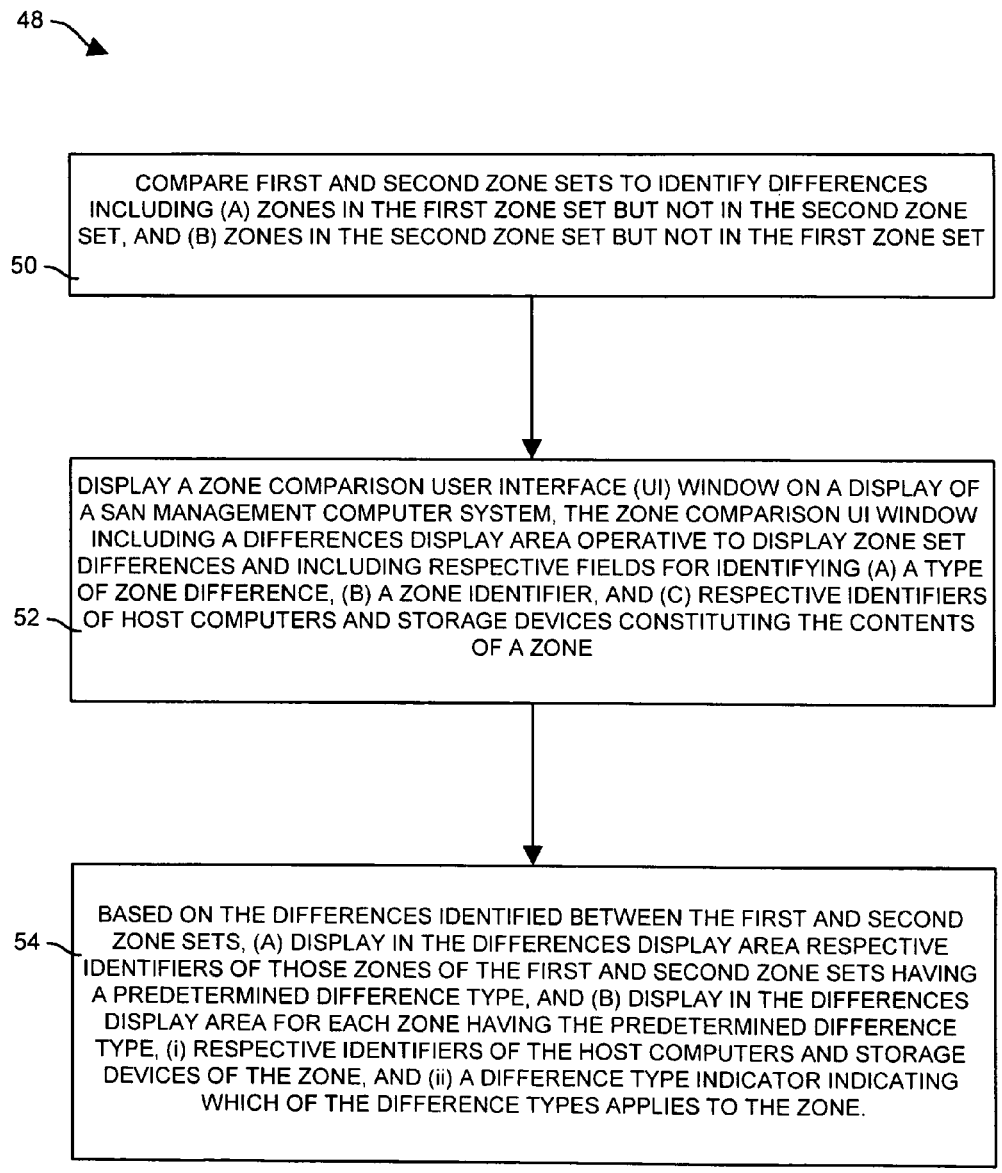
FIG. 5 is a flow diagram of a zone comparison process performed by the SAN management station in the system of FIG. 1.

FIG. 5 shows a portion of the SAN management process 46. Specifically, the portion shown is a zone comparison process 48 that can be invoked by a SAN management user. Specific ways of invoking the zone comparison process 48 are shown below.

In step 50, the zone comparison process 48 compares first and second zone sets that have been specified by the user, in order to identify differences between the two zone sets. In particular, the zone comparison process 48 identifies (a) any zones that reside in the first zone set but not in the second, and (b) any zones that reside in the second zone set but not in the first.

In step 52, the zone comparison process 48 displays a zone comparison user interface (UI) window on a display of the SAN management computer system or station 20. The zone comparison UI window includes a differences display area that includes fields for identifying (a) a type of zone difference, (b) a zone identifier, and (c) identifiers of host computers 12 and storage devices 16 constituting a zone 30. Specific examples of such a differences display area are described below.

In step 54, based on the differences between the first and second zone sets, the zone comparison process 48 displays the following information in the differences display area of the zone comparison UI window: (a) identifiers of zones in the first and second zone sets having a difference of a predetermined type, which may be selected by the user, and (b) for each such zone, (i) identifiers of host computers 12 and storage devices 16 of the zone, and (ii) a difference type indicator indicating the type of difference that applies to the zone. In an example given below, the difference type indicator may include a character string such as "Zones in A Only", where "A" is an identifier of one of the zone sets being compared. This indication would apply to zones that appear in zone set A but not in the other zone set involved in the zone set comparison process.

Figure 6:
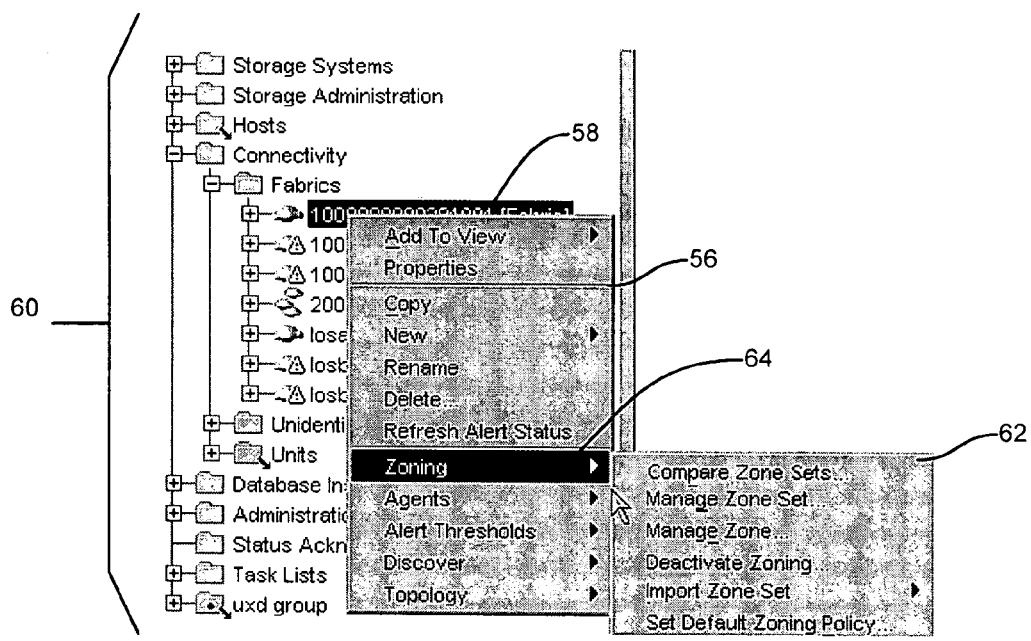
FIGS. 6-14 are screen shots of user interface windows and pop-up menus displayed as part of a graphical user interface on the SAN management station of FIGS. 1 and 4 in connection with the zone comparison process of FIG. 3.

FIG. 6 shows a graphical user interface screen via which the zone comparison process of FIG. 5 may be initiated. A first pop-up menu 56 has appeared as a result of "right-clicking" on a fabric identifier 58 in a tree-structured display 60 of managed objects within the SAN 10. In the illustrated embodiment, the fabric identifier 58 is a 16-digit "world wide name" that is uniquely identifies a particular fabric. "Right clicking" refers to a user input action (such as pressing a secondary button on a mouse) on the highlighted fabric identifier 58 that results in a menu of possible actions for the fabric identifier 58 being displayed. The user has also invoked a second pop-up menu 62 by hovering the screen cursor over the highlighted word "Zoning" 64. The second pop-up menu 62 has the names of several zoning-related actions that a user might want to initiate, such as managing zones or zone sets, deactivating zoning, etc. These actions include comparing zone sets, which is associated with the phrase "Compare Zone Sets . . . " appearing on the second pop-up menu 62. When the user hovers the cursor over this phrase and selects it, the zone comparison process 48 of FIG. 5 is initiated.

Figure 7:
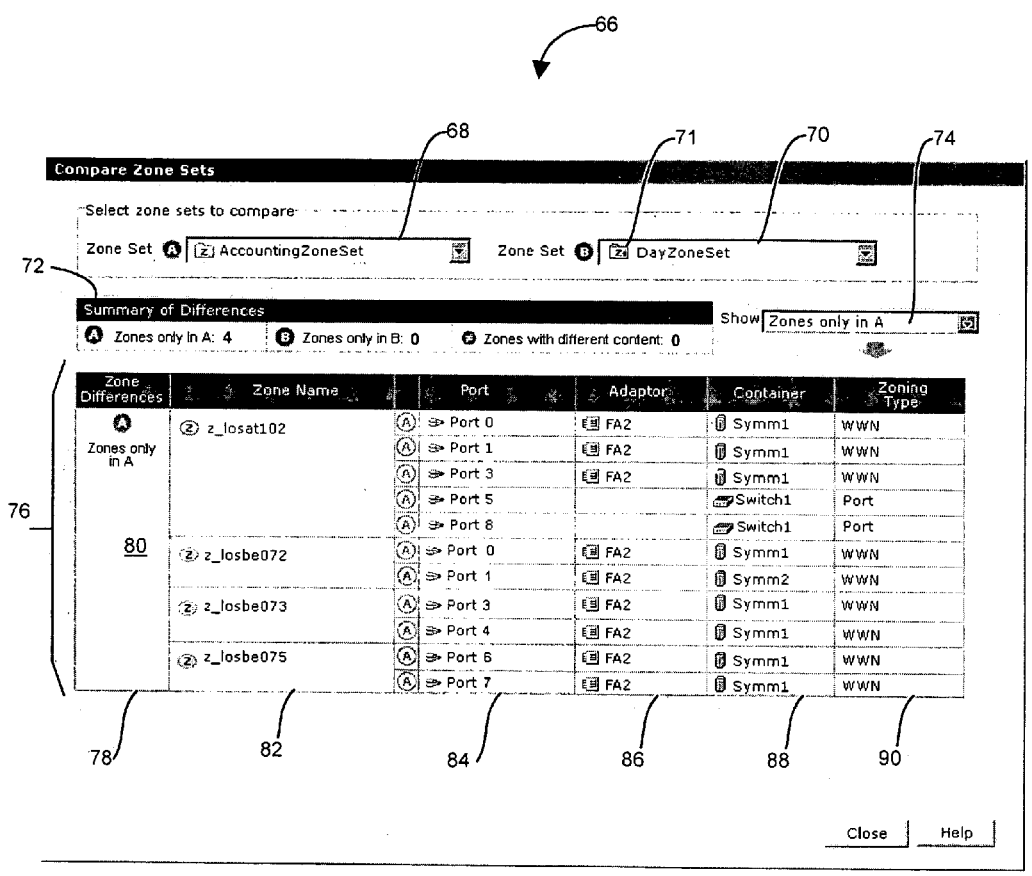

FIG. 7 shows a zone comparison user interface (UI) window 66 employed by the zone comparison process 48. The UI window 66 is displayed to a user on the display 44 of the SAN management station 20. During operation, the user can make selections in various fields using the input device 42 to identify the zone comparison information that is of interest, as described in more detail below.

At the top of the UI window appear two fields (combination boxes) 68, 70 via which the user selects the zone sets to be compared. The selection is made by a pull-down list (not shown) of zone sets, which is populated with the names of zone sets defined for the current fabric (e.g., the fabric identified by the fabric identifier 58 of FIG. 6). In the state shown in FIG. 7, the field 68 for Zone Set "A" identifies a zone set named Accounting Zone Set, and the field 70 for Zone Set "B" identifies a zone set named DayZoneSet. Each field 68, 70 also includes an icon 71 in the form of a folder. The icon 71 can be used to indicate whether the zone set named in the field is the currently active zone set, for example by employing a particular color. In one embodiment, the icon 71 can be "greyed out" for inactive zone sets, and shaded green for the active zone set.

Below the fields 68, 70 are a Summary of Differences area 72 and a user control field 74. The user control field is used by a user to identify which zone set differences are to be displayed. The Summary of Differences area has fields for identifying (i) zones "only in A", i.e., zones that are in zone set A but not in zone set B; (ii) zones only in B; and (iii) zones that are in both zone sets but have different contents in each. This latter case refers to zones that have the same name in each zone set, but non-identical contents. In some cases, this situation is an error either in naming the zones or in selecting their contents, while in other cases it may be the result of a user modifying a zone to add ports to it. Part of the function of the zone comparison process 48 is to identify such potential errors.

In the state shown in FIG. 7, the UI window 66 shows the phrase "Zones only in A" in the user control field 74 as a result of prior user selection. Due to this selection, the remaining area of the UI window 66 (described below) has information for only those zones that are only in zone set A. Examples of other user selections are described below.

A differences display area 76 is used to display detailed information about the differences that have been identified by the zone comparison process 48. The differences display area 76 is organized in a chart-like fashion, having columns for different information and rows for different zones for which information is to be displayed. In a first column 78, the type of zone set difference is identified. For the state of the UI window shown in FIG. 7, the only item appearing in this column is "Zones only in A", as requested by the user via the user control field 74. This difference type designator is applicable to all the zones that are shown, and thus the cell 80 in which it appears extends vertically across all displayed rows.

A second column 82 has the heading "Zone name" and includes identifiers of zones having the difference type identified in column 78 for that zone. For example, a zone with the name (or identifier) "z_losat102" appears only in zone set A, and thus this identifier appears in column 82. In the example of FIG. 7, four such zones are identified.

For each zone identified in column 82, a number of rows are used to show the contents of the zone. Generally, each row has respective entries in a Port column 84, an Adaptor column 86, a Container Column 88, and a Zoning type column 90. For each row, the entry in the Port column 84 identifies a port 30 of a switch 14 (see FIG. 3) that is a member of the zone. The entry in the Adaptor column 86 identifies an adapter circuit card within the switch or fabric on which the port is located.

As can be seen, the zone z_losat102 includes five ports, identified as ports 0, 1, 3, 5 and 8 of adapter FA2. Zones z_losbe072, z_losbe073, and z_losbe075 include two ports apiece. All of these zones are part of Zone Set A (e.g., AccountingZoneSet) and not part of Zone Set B (e.g., DayZoneSet).

Figure 8:
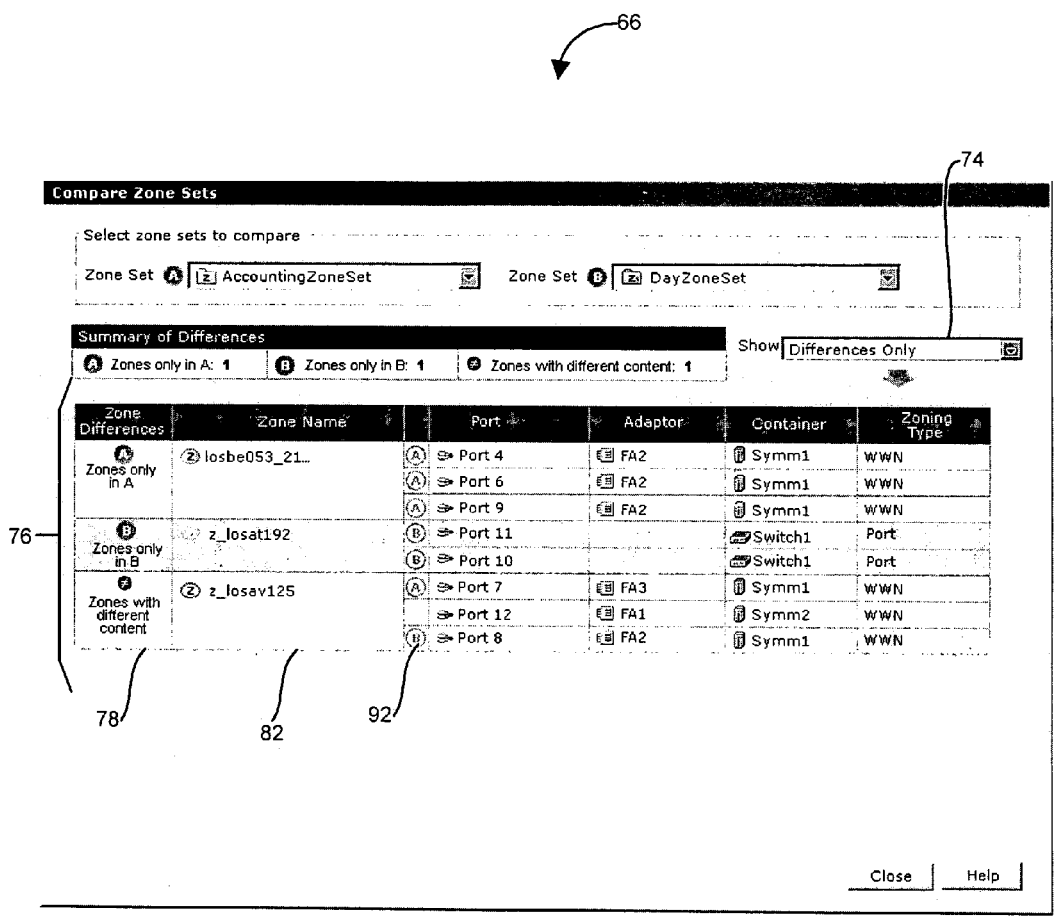

FIG. 8 shows another example of the UI window 66 reflecting the user's selection of "Differences Only" in the user control field 74. In this case, there are three sets of rows in the differences display area 76, each identified by a respective difference type indicator in column 78—Zones only in A, Zones only in B, and Zones with different contents. One zone of each type is identified in column 82. Thus, zone z_losbe053_21 is in Zone Set A but not in Zone Set B; zone z_losat192 is in Zone Set B but not in Zone Set A, and the contents of zone z_losav125 in Zone Set A are different from the same-named zone is Zone Set B.

With respect to zones identified as having different content, a column 92 is used for further information. For those ports appearing in the zone in both zones sets, the column is blank. For ports appearing in only one zone set, the letter A or B is present to identify which zone set the zone is a member of. In the illustrated example, the zone z_losav125 includes Port 7 and Port 12 in Zone Set A, and Port 12 and Port 8 in Zone Set B. Port 7 is shown as being in A only, Port 8 in B only, and Port 12 as being in both.

Figure 9:
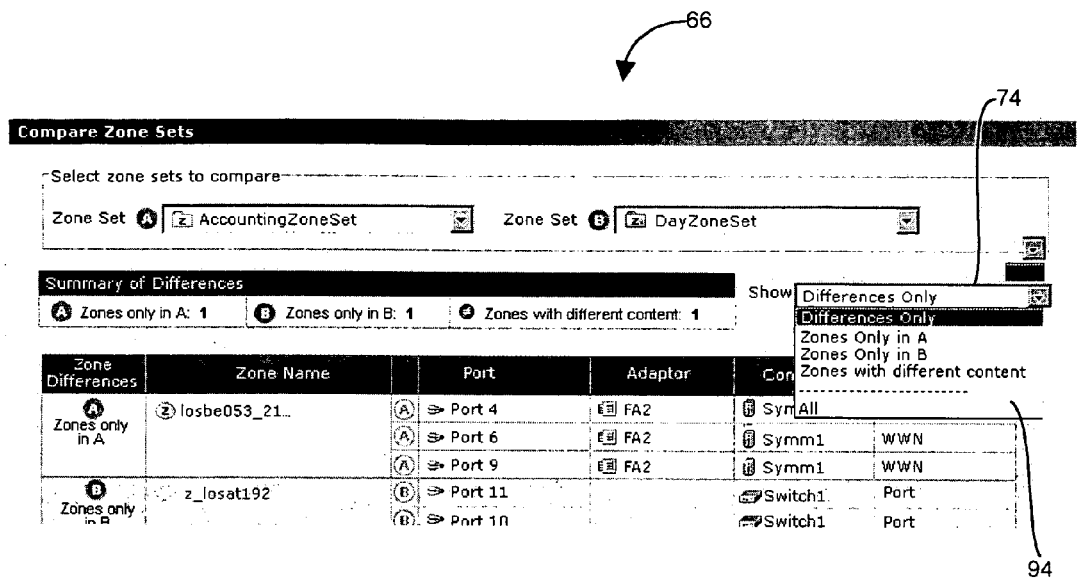

FIG. 9 is a partial view of the UI window 66 showing a drop-down list 94 for the user control field 74. In the illustrated embodiment, the user can select from the items shown, which include Zones only in A, Zones only in B, Differences only, Zones with different content, and All. For each selection, the zone comparison process 48 populates the differences display area with the applicable zones. When the All option is selected, every zone appearing in either Zone Set A or Zone Set B is listed.

Figure 10:
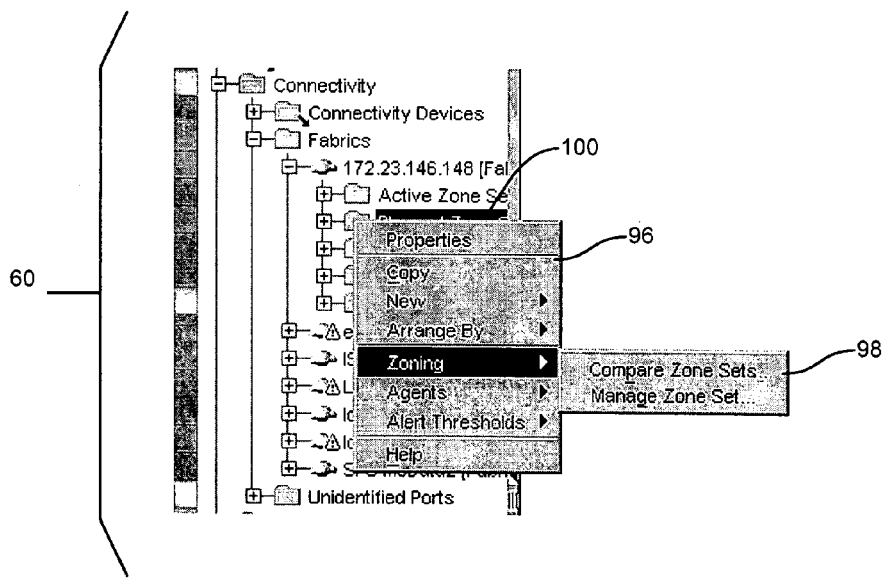
Figure 11:
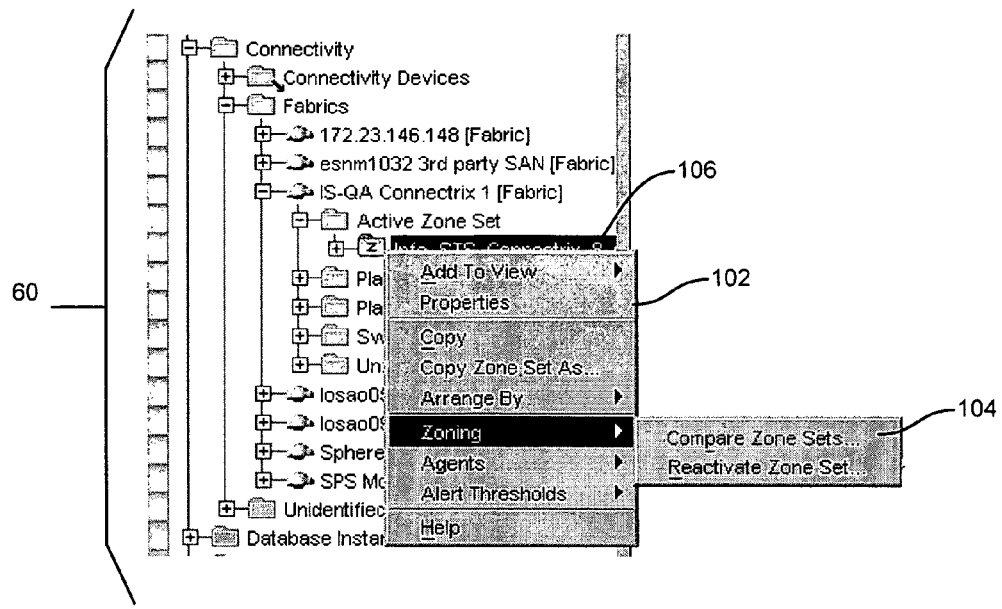
Figure 12:
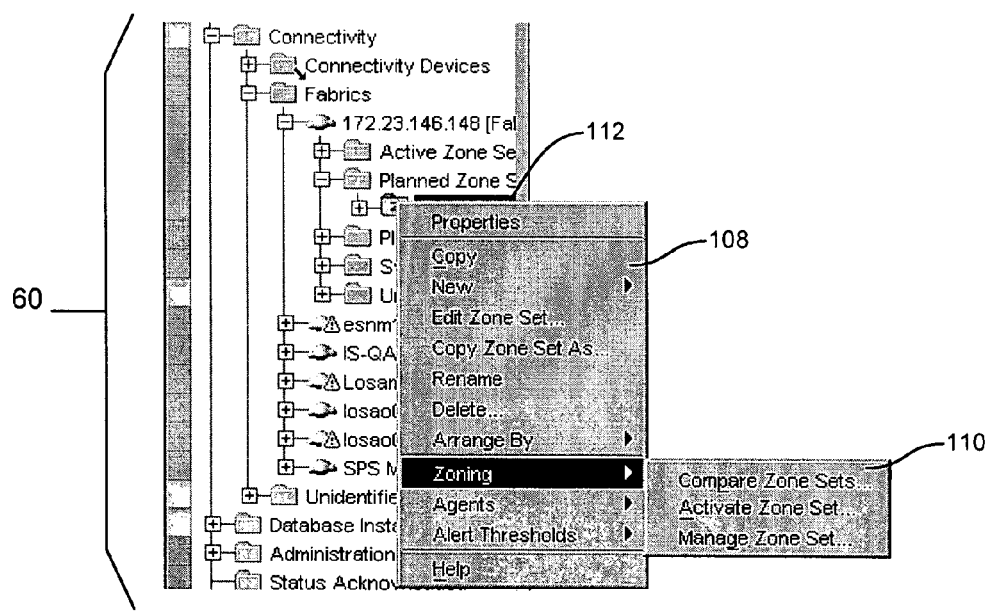

FIGS. 10-12 show alternative ways in which the zone comparison process can be activated from the display 60 of managed objects. In FIG. 10, pop-up menus 96 and 98 appear as a result of a right-click on a "Planned Zone Sets" object 100, which is defined for a fabric object 172.23.146.148. In FIG. 11, pop-up menus 102 and 104 appear as a result of a right-click on a zone set object 106 under the object "Active Zone Set" of a fabric object IS-QA Connectrix. In FIG. 12, pop-up menus 108 and 110 appear as a result of a right-click on a zone set object 112 under the object "Planned Zone Sets" of the fabric object 172.23.146.148.

Figure 13:
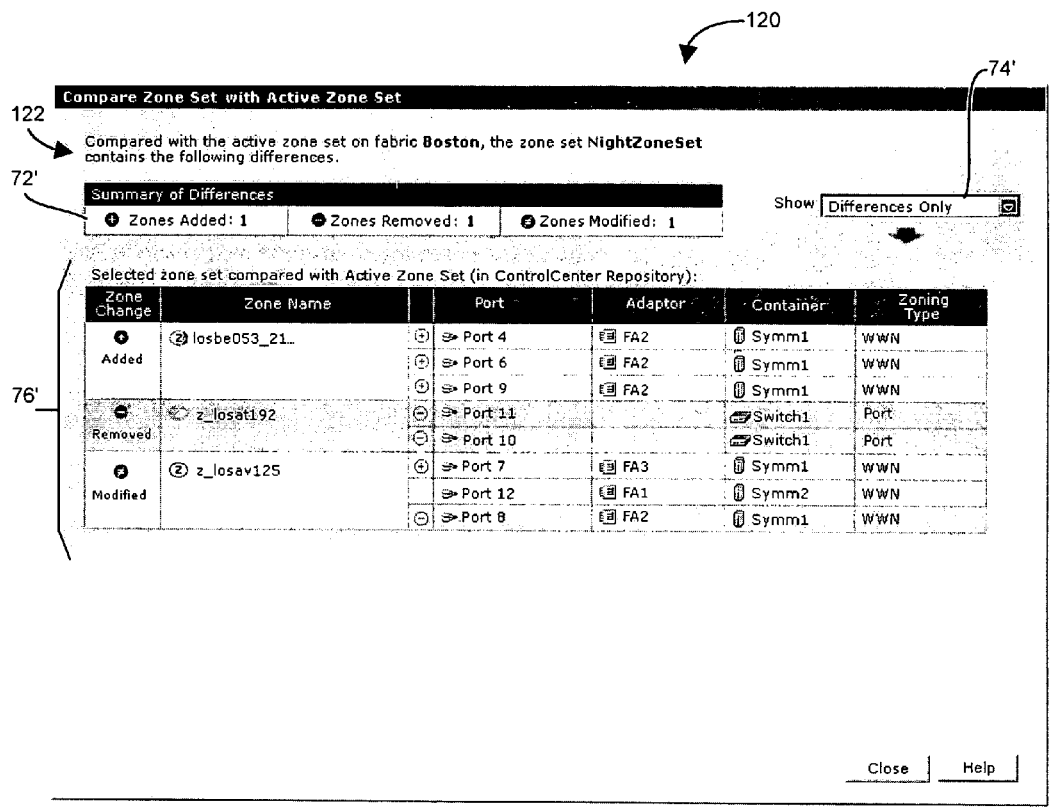

FIG. 13 shows a second UI window 120 utilized for the Compare with Active Zone Set function. It will be observed that the UI window 120 is similar to the Compare Zone Sets UI window 66 (see e.g., FIG. 7). It includes a Summary of Differences area 72', user control field 74', and differences display area 76'. There is no counterpart of the zone selection fields 68 and 70, for the following reasons. There is only one zone set active at a time, so it is necessary to select only a zone set to be compared with whatever zone set is currently active. It would be possible to have a single selection field for selecting the zone to be compared. In the illustrated embodiment, however, the zone set has already been selected as part of navigating to the UI window 120, for example as described above with reference to FIG. 12.

Figure 14:
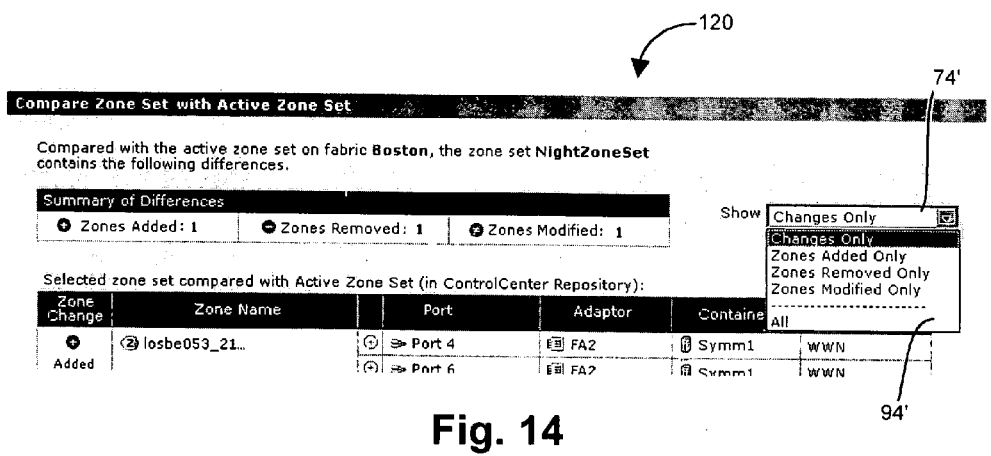

FIG. 14 shows a pull-down list 94' that appears on user activation of the user control field 74'. The items in the list 94' are slightly different from those appearing in list 94 (FIG. 9). The Zones Added Only item refers to zones that reside in the selected zone set but not in the active zone set. The Zones Removed Only refers to zones that reside in the active zone set but not the selected zone set. Zones Modified Only refers to zones having different contents in the two zones sets, and All refers to all zones appearing in either zone set.

Those skilled in the art will appreciate that embodiments and variations of the present invention other than those explicitly disclosed herein are possible. It is to be understood that modifications to the methods and apparatus disclosed herein are possible while still achieving the objectives of the invention, and such modifications and variations are within the scope of this invention. Accordingly, the scope of the present invention is not to be limited by the foregoing description of embodiments of the invention, but rather only by the claims appearing below.

What is claimed is:

1. A method of enabling a user to manage zoning in a storage area network (SAN), the SAN having a plurality of zone sets, each zone set including a respective plurality of zones, each zone defining an access-control grouping of a respective host computer and one or more respective storage devices of the SAN, each zone set when active in the SAN being enforced by switches in the SAN such that the host computer of each zone of the zone set is allowed to access the storage devices of the same zone and not allowed to access storage devices of other zones of the zone set, the method comprising:

(1) comparing a first zone set and a second zone set to identify differences therebetween, the differences including (a) zones in the first zone set but not in the second zone set, and (b) zones in the second zone set but not in the first zone set;

(2) displaying a zone comparison user interface (UI) window on a display of a SAN management computer system, the zone comparison UI window including a differences display area operative to display zone set differences, the differences display area including respective fields for identifying (a) a type of zone difference, (b) a zone identifier, and (c) respective identifiers of host computers and storage devices constituting the contents of a zone;

(3) based on the differences identified between the first and second zone sets, (a) displaying, in the differences display area, respective identifiers of those zones of the first and second zone sets having a predetermined difference type, and (b) displaying, in the differences display area for each zone having the predetermined difference type, (i) respective identifiers of the host computers and storage devices of the zone, and (ii) a difference type indicator indicating which of the difference types applies to the zone;

wherein displaying the difference type indicator includes displaying an icon indicating which of the difference types applies to the zone; and wherein the zone comparison user interface window is displayed in response to receiving a selection of a zoning-related object from objects of the SAN displayed at multiple hierarchical levels including a fabric level and a zone set level.

2. A method according to claim 1, further comprising:

wherein the zone comparison UI window includes a control operable by the user to select from among a plurality of types of zone set differences to be displayed, the types including (i) zones in only one of two zone sets being compared, and (ii) zones in both of two zone sets being compared but having different contents in each, and wherein the displaying of both 3(a) and 3(b) are based on the user's selection of which type of zone set differences are to be displayed; and wherein the zone comparison UI window includes a summary display area operative to display a summary of zone set differences displayed in the differences display area, and further comprising displaying in the summary display area summary information identifying the number of zones having the selected difference type.

3. A method according to claim 1, wherein the differences identified in (1) include zones in both the first and second zone sets but having different contents in each, and wherein the predetermined difference type is selected from a plurality of difference types including zones with different contents in the first and second zone sets.

4. A method according to claim 1, wherein the first and second zone sets are both inactive in the SAN.

5. A method according to claim 1, further comprising:

wherein the zone comparison UI window includes respective fields for identifiers of both the first and second zone sets; and wherein each zone set identifier is displayed in the respective field along with an icon indicating whether the zone set is active in the SAN.

6. A method according to claim 1, further comprising:

wherein one of the first and second zone sets is active in the SAN and the other of the first and second zone sets is inactive in the SAN; and wherein the zone difference types includes added zones that are in the inactive zone set but not in the active zone set, removed zones that are in the active zone set but not in the inactive zone set, and modified zones having different contents in each of the active and inactive zones.

7. A method according to claim 1, wherein the difference display area includes respective sub-areas for identifying device ports belonging to zones whose identifiers are displayed in the differences display area.

8. A method according to claim 1, further comprising:

displaying a tree structure of objects of the SAN; and in response to user selection of a zoning-related object of the tree structure, displaying a zoning pop-up menu listing a plurality of actions that can be taken with respect to the selected object;

and wherein the zone comparison UI window is displayed in response to user selection of a zone set comparison action from the zoning pop-up menu.

9. A method according to claim 8, further comprising:

wherein the zoning pop-up menu is displayed in response to user selection of objects at multiple hierarchical levels of the tree structure; and wherein the multiple hierarchical levels include a fabric level and a zone set level.

10. A method according to claim 1, wherein the displaying in 3(b)(i) includes displaying, in the differences display area for each zone having the predetermined difference type, respective identifiers of switch ports of the zone.

11. A computerized system, comprising:

a graphical display operative to display a graphical interface; and a processor coupled to the graphical display, the processor being operative to execute a method of enabling a user to manage zoning in a storage area network (SAN), the SAN having a plurality of zone sets, each zone set including a respective plurality of zones, each zone defining an access-control grouping of a respective host computer and one or more respective storage devices of the SAN, each zone set when active in the SAN being enforced by switches in the SAN such that the host computer of each zone of the zone set is allowed to access the storage devices of the same zone and not allowed to access storage devices of other zones of the zone set, the method comprising:

(1) comparing a first zone set and a second zone set to identify differences therebetween, the differences including (a) zones in the first zone set but not in the second zone set, and (b) zones in the second zone set but not in the first zone set;

(2) displaying a zone comparison user interface (UI) window on a display of a SAN management computer system, the zone comparison UI window including a differences display area operative to display zone set differences, the differences display area including respective fields for identifying (a) a type of zone difference, (b) a zone identifier, and (c) respective identifiers of host computers and storage devices constituting the contents of a zone;

(3) based on the differences identified between the first and second zone sets, (a) displaying, in the differences display area, respective identifiers of those zones of the first and second zone sets having a predetermined difference type, and (b) displaying, in the differences display area for each zone having the predetermined difference type, (i) respective identifiers of the host computers and storage devices of the zone, and (ii) a difference type indicator indicating which of the difference types applies to the zone;

wherein displaying the difference type indicator includes displaying an icon indicating which of the difference types applies to the zone; and wherein the zone comparison user interface window is displayed in response to receiving a selection of a zoning-related object from objects of the SAN displayed at multiple hierarchical levels including a fabric level and a zone set level.

12. A computer program product that includes a non-transitory computer readable medium having instructions stored thereon for enabling a user to manage zoning in a storage area network (SAN), the SAN having a plurality of zone sets, each zone set including a respective plurality of zones, each zone defining an access-control grouping of a respective host computer and one or more respective storage devices of the SAN, each zone set when active in the SAN being enforced by switches in the SAN such that the host computer of each zone of the zone set is allowed to access the storage devices of the same zone and not allowed to access storage devices of other zones of the zone set, such that the instructions, when carried out by a computerized system, cause the computerized system to:

(1) compare a first zone set and a second zone set to identify differences therebetween, the differences including (a) zones in the first zone set but not in the second zone set, and (b) zones in the second zone set but not in the first zone set;

(2) display a zone comparison user interface (UI) window on a display of a SAN management computer system, the zone comparison UI window including a differences display area operative to display zone set differences, the differences display area including respective fields for identifying (a) a type of zone difference, (b) a zone identifier, and (c) respective identifiers of host computers and storage devices constituting the contents of a zone;

(3) based on the differences identified between the first and second zone sets, (a) display, in the differences display area, respective identifiers of those zones of the first and second zone sets having a predetermined difference type, and (b) display, in the differences display area for each zone having the predetermined difference type, (i) respective identifiers of the host computers and storage devices of the zone, and (ii) a difference type indicator indicating which of the difference types applies to the zone;

wherein displaying the difference type indicator includes displaying an icon indicating which of the difference types applies to the zone; and wherein the zone comparison user interface window is displayed in response to receiving a selection of a zoning-related object from objects of the SAN displayed at multiple hierarchical levels including a fabric level and a zone set level.

13. The method of claim 1, further comprising:

identifying a first zone set and creating a second zone set, the second zone set being a planned replacement zone set that will replace the first zone set, the second zone set being a modified version of the first zone set, the first zone set being an active zone set and the second zone set being an inactive zone set.

14. The method of claim 13, wherein the differences identified in (1) include zones in both the first zone set and the second zone set and having different contents in each, such that the zones have a same name and non-identical contents, and wherein the predetermined difference type is selected from a plurality of difference types including zones with different contents in the first and second zone sets.

15. The method of claim 8, wherein the zone comparison UI window includes a control operable by the user to select from among a plurality of types of zone set differences to be displayed, the types including (i) zones in only one of two zone sets being compared, and (ii) zones in both of two zone sets being compared but having different contents in each, and wherein the displaying of both 3(a) and 3(b) are based on the user's selection of which type of zone set differences are to be displayed; and wherein the zone comparison UI window includes a summary display area operative to display a summary of zone set differences displayed in the differences display area, and further comprising displaying in the summary display area summary information identifying the number of zones having the selected difference type.

16. The method of claim 15, wherein the zone comparison UI window includes respective fields for identifiers of both the first and second zone sets;

wherein each zone set identifier is displayed in the respective field along with an icon indicating whether the zone set is active in the SAN;

wherein one of the first and second zone sets is active in the SAN and the other of the first and second zone sets is inactive in the SAN;

wherein the zone difference types includes added zones that are in the inactive zone set but not in the active zone set, removed zones that are in the active zone set but not in the inactive zone set, and modified zones having different contents in each of the active and inactive zones;

wherein the differences identified in (1) include zones in both the first and second zone sets but having different contents in each, and wherein the predetermined difference type is selected from a plurality of difference types including zones with different contents in the first and second zone sets; and wherein the displaying in 3(b)(i) includes displaying, in the differences display area for each zone having the predetermined difference type, respective identifiers of switch ports of the zone.

17. The method of claim 16, further comprising:

identifying the first zone set and creating the second zone set, the second zone set being a planned replacement zone set that will replace the first zone set, the second zone set being a modified version of the first zone set, the first zone set being an active zone set and the second zone set being an inactive zone set; and wherein the differences identified in (1) include zones in both the first zone set and the second zone set and having different contents in each, such that the zones have a same name and non-identical contents, and wherein the predetermined difference type is selected from a plurality of difference types including zones with different contents in the first and second zone sets.

18. The method of claim 16, further comprising:

wherein the displaying in 3(b)(i) includes displaying, in the differences display area for each zone having the predetermined difference type, respective identifiers of switch ports of the zone; and wherein the difference display area includes respective sub-areas for identifying device ports belonging to zones whose identifiers are displayed in the differences display area.

19. The method of claim 16, further comprising:

wherein one of the first and second zone sets is active in the SAN and the other of the first and second zone sets is inactive in the SAN;

wherein the zone difference types includes added zones that are in the inactive zone set but not in the active zone set, removed zones that are in the active zone set but not in the inactive zone set, and modified zones having different contents in each of the active and inactive zones; and displaying a pull-down list of selectable items, the selectable items including a first item that causes display of zones that reside in a selected zone set but not in an active zone set, a second item that causes display of zones that reside in the active zone set but not the selected zone set, and a third item that causes display of zones having different contents in two zone sets.

20. The method of claim 16, further comprising:

wherein the zoning pop-up menu is displayed in response to user selection of objects at multiple hierarchical levels of the tree structure;

wherein the multiple hierarchical levels include a fabric level and a zone set level;

wherein the first and second zone sets are both inactive in the SAN; and wherein the difference type indicator includes displaying a character string.

\* \* \* \* \*